United States Patent [19]

Arthur et al.

[11] Patent Number: 4,566,717
[45] Date of Patent: Jan. 28, 1986

[54] LIGHT TRAILER WITH INDEPENDENT WHEEL SUSPENSIONS

[75] Inventors: Gregory L. Arthur, Mukwanago; Wayne E. Hunnicutt, Big Bend, both of Wis.

[73] Assignee: G & J Industries, Inc., Genesee Depot, Wis.

[21] Appl. No.: 588,651

[22] Filed: Mar. 12, 1984

[51] Int. Cl.[4] ............................................. B60G 11/16
[52] U.S. Cl. .................................... 280/701; 280/696; 280/724; 280/725; 267/20 R
[58] Field of Search .................... 267/20 A, 58, 20 R; 280/725, 756, 724, 696, 700, 701, 788, 789, 690

[56] References Cited

U.S. PATENT DOCUMENTS

| | | | |
|---|---|---|---|
| 2,525,506 | 10/1950 | Wiedman | 280/701 |
| 2,549,320 | 4/1951 | Makin | 280/725 |
| 3,201,142 | 8/1965 | Dangavthier | 280/724 |
| 3,787,073 | 1/1974 | Giuseppe | 280/801 |

Primary Examiner—Richard A. Bertsch
Attorney, Agent, or Firm—James E. Nilles

[57] ABSTRACT

A motorcycle trailer with two independently suspended wheels has a frame comprised of front and rear U-shaped members. The legs of the rear one project forward between the rearwardly projecting legs of the front one and are secured at their front ends to the bight portion of the front one. To the rear end of each leg of the front member is fixed an upright support having at its upper end a pivotal connection to the top of a vertical element of an L-shaped wheel carrying arm. A horizontal element of that arm projects rearward from the bottom of the vertical element, in laterally inwardly offset relation to it. A wheel axle fixed to the rear of the horizontal element projects laterally outwardly from it to dispose the wheel in rearward alignment with the pivotal connection. A coiled tension spring and a cylinder-type shock damper are connected between the vertical element and the leg of the front member.

7 Claims, 4 Drawing Figures

LIGHT TRAILER WITH INDEPENDENT WHEEL SUSPENSIONS

FIELD OF THE INVENTION

This invention relates generally to light two-wheel trailers intended to be towed by small vehicles such as motorcycles and subcompact automobiles, and the invention is more particularly concerned with a frame for such a trailer on which a body can be mounted and which features trailing arm independent wheel suspensions.

BACKGROUND OF THE PRIOR ART

It is well known that certain types of light trailers have a tendency to sway or weave from side to side instead of tracking stably behind the towing vehicle. When the trailer is towed by a four-wheel vehicle such as an automobile or a truck, the towing vehicle usually has sufficient mass and stability to resist being turned by the trailer. But if the towing vehicle is a motorcycle, swaying or weaving of the trailer obviously creates a very dangerous condition.

In general, assuming that a two-wheel trailer is properly hitched and that its wheels are tracking properly, it is usually caused to sway or weave by wind gusts, by bumps in the pavement, or by a combination of these. A motorcyclist is naturally well aware of wind conditions and, if nothing else, can avoid towing a trailer in gusty weather. But pavement irregularities may be encountered at any time, and they are usually unforeseen and unexpected. Thus an important safety requirement for a motorcycle-towed trailer is that it tow straight and true on bumpy surfaces as well as on perfectly smooth pavement.

It has been recognized for some time that a two-wheel trailer has a more stable ride, with less weaving and side sway, if its wheels are independently suspended so that each can make vertical shock absorbing movements relative to the frame without influencing the other wheel or being influenced by it. This is pointed out in U.S. Pat. No. 2,549,320, issued to M. E. Makin in 1950, which disclosed a light two-wheel trailer wherein the wheels had a semi-independent suspension that was said to eliminate "any tilting or lateral swaying" of the trailer bed and to minimize "the danger of upsetting a vehicle caused by an unevenly distributed or shifting load." However, the two wheels of the trailer disclosed by Makin were mounted on the opposite ends of a single rigid axle that extended across the trailer, so that both wheels changed their orientations when one of them rose or fell in passing over a bump.

Various arrangements for independent wheel suspensions have been proposed from time to time, as for example in U.S Pat. No. 3,201,142, issued to M. Dangauthier in 1965 and U.S. Pat. No. 2,905,575, issued to H. Locker in 1959, but most of these have been intended for relatively large and heavy vehicles and have been inherently unsuitable for adaptation to a motorcycle trailer, which has stringent requirements not imposed by larger vehicles.

To avoid braking and acceleration problems, a motorcycle trailer should weigh as little as possible, but it must nevertheless be sturdy. For the best combination of strength and lightness, the body of the trailer should be mounted on a bed or frame to which the wheels are connected. However, the frame and the wheel suspensions must be so arranged as not to require sacrifice of load capacity of the body while nevertheless supporting the body at a level no higher than is adequate for road clearance, to keep the center of gravity low. The frame and the wheel suspensions should also be so arranged that the body can be reasonably well streamlined, to minimize wind forces that could create undue drag on the motorcycle as well as causing swaying or weaving of the trailer.

It is a premise of this invention that the tracking stability and freedom from side sway that are desired in a motorcycle trailer are best achieved by providing the trailer with independent wheel suspensions of the type comprising a trailing arm for each wheel, wherein the wheel axle is rigidly connected to a rear end of the trailing arm and the front end of the trailing arm has a pivot connection to the trailer frame that enables the wheel to swing up and down relative to the frame. A shock absorbing means must of course be connected between the trailing arm and the relatively fixed part of the trailer frame. The arrangement of the trailing arm, its mounting, and the shock absorbing means must be such that these elements are compatible with a body that meets the requirements mentioned above.

The wheels of a motorcycle trailer are necessarily small, so that they are affected by every small irregularity in pavement and are therefore constantly moving up and down in their shock absorbing motion relative to the frame. This constant action imposes stringent requirements upon the pivot connections between the frame and the trailing arms, which must be capable of a long useful life with a minimum of attention.

One other consideration is worthy of mention. The cost of transporting a motorcycle trailer from the manufacturer to the ultimate user is necessarily included in the price that the user pays for it. Transportation costs can be reduced if the trailer can be shipped in a partially disassembled condition that materially reduces its bulk, but such a gain should not be realized at the cost of requiring complicated or time-consuming assembly of the trailer at its destination or sacrifice of sturdiness or dependability.

SUMMARY OF THE INVENTION

The foregoing discussion has focused on trailers for motorcycle towing because such trailers present especially severe requirements. It will be understood, however, that a trailer suitable for motorcycle towing is also well suited for towing by other vehicles, and that the principles of a trailer satisfactory for motorcycle towing can be advantageously embodied in certain types of larger trailers.

The general object of the present invention is to provide a light two-wheel trailer that is well suited for towing by a motorcycle, having independent wheel suspensions that afford excellent towing stability and freedom from side sway, and meeting all of the other requirements set forth above.

A more specific object of this invention is to provide a sturdy frame for a light two-wheel trailer, on which a body of substantial capacity can be readily mounted and which has a compact, sturdy and inexpensive trailing arm suspension for each of the wheels, said suspension being so arranged that each wheel is exactly rearwardly in line with the pintle on which its trailing arm swings, so that the trailing arm pivot connection has a long useful life because it is not subjected to high forces that would tend to swing its pintle about either of its ends.

Another specific object of the invention is to provide an independent wheel suspension for a light two-wheel trailer wherein the shock absorbing means for each wheel comprises both a spring and a shock absorber, to ensure a smooth, stable ride; but wherein the wheel suspension, including its shock absorbing means, is nevertheless simple, inexpensive and compact.

In general, these and other objects of the invention that will appear as the description proceeds are achieved in the light two-wheel trailer of this invention, which has a substantially rigid frame on which a body can be mounted and which has laterally opposite side portions. More specifically the invention relates to a wheel suspension for each wheel of such a trailer, connecting the wheel with one of said side portions of the frame for relative vertical shock absorbing motion independently of the other wheel. The wheel suspension comprises a substantially upright support fixed on said side portion of the frame and a rigid substantially L-shaped wheel arm having a substantially vertical portion that is pivoted at an upper end thereof to the top portion of said support, to be confined to swinging about a laterally extending axis, and having a substantially horizontal portion that projects rearward from the bottom of said substantially vertical portion and is in laterally inwardly offset relation thereto. An axle on which the wheel is rotatable projects laterally outwardly from the rear end of said substantially horizontal portion of the wheel arm. Shock absorbing means is connected between said side portion of the frame and said substantially vertical portion of the wheel arm, to yieldingly resist upward movement of the axle whereby said substantially vertical portion of the wheel arm is swung rearwardly away from a normal substantially vertical orientation.

Preferably the frame comprises a substantially U-shaped front member having a laterally extending bight portion from which a pair of legs project rearwardly, and a substantially U-shaped rear member having a laterally extending bight portion spaced to the rear of said bight portion of the front member and from which a pair of legs project forwardly that are spaced laterally inwardly from the legs of the front member and are secured at their front ends to the bight portion of the front member. Each of said supports is mounted on the rear end portion of a leg of the front member.

An elongated tongue underlies the bight portions of said front and rear members and is secured to them, preferably detachably, and projects forwardly beyond the front member for connection to a towing vehicle.

Each support preferably comprises a pair of flatwise parallel plate-like members between which the vertical portion of the wheel arm is swingable. The shock absorbing means comprises a coiled tension spring having a rear end connected with the lower end of said vertical portion of the wheel arm and a front end connected with its adjacent leg of the U-shaped front member, in forwardly spaced relation to the rear end of that leg, and further comprises a shock absorber having a front end connected with said arm intermediate its upper and lower ends and which extends forwardly between said plate-like members and has a front end connected with said leg of the front member.

BRIEF DESCRIPTION OF DRAWINGS

In the accompanying drawings, which illustrate what is now regarded as a preferred embodiment of the invention.

DETAILED DESCRIPTION OF PREFERRED EMBODIMENT OF THE INVENTION

Figure 1:
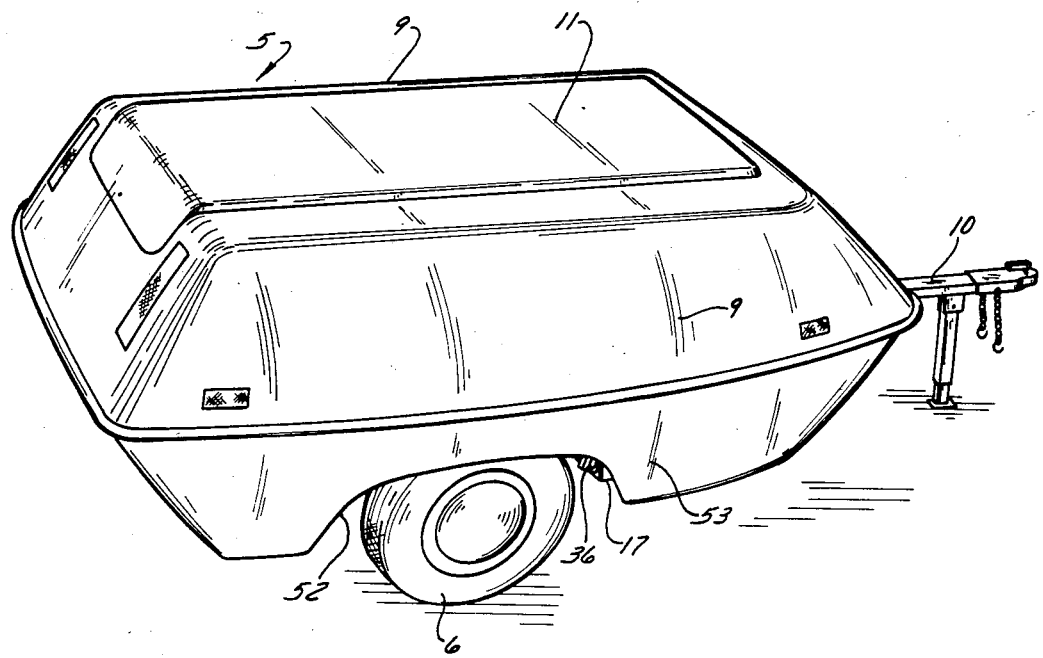
FIG. 1 is a perspective view of a trailer embodying the principles of this invention.
Figure 4:
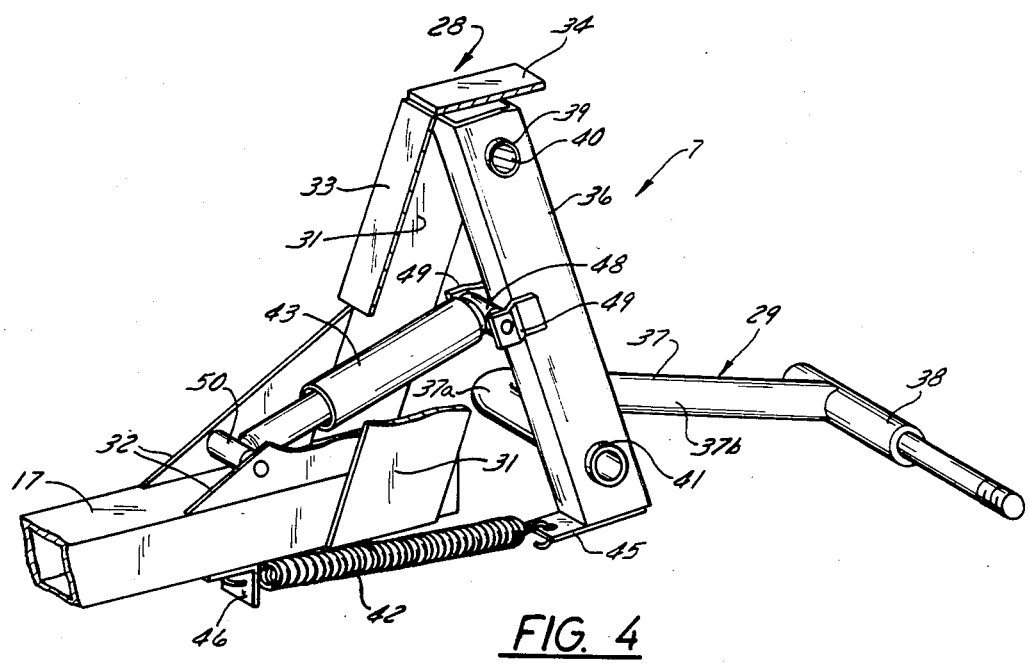
FIG. 4 is a perspective view of one of the wheel suspensions.
Figure 2:
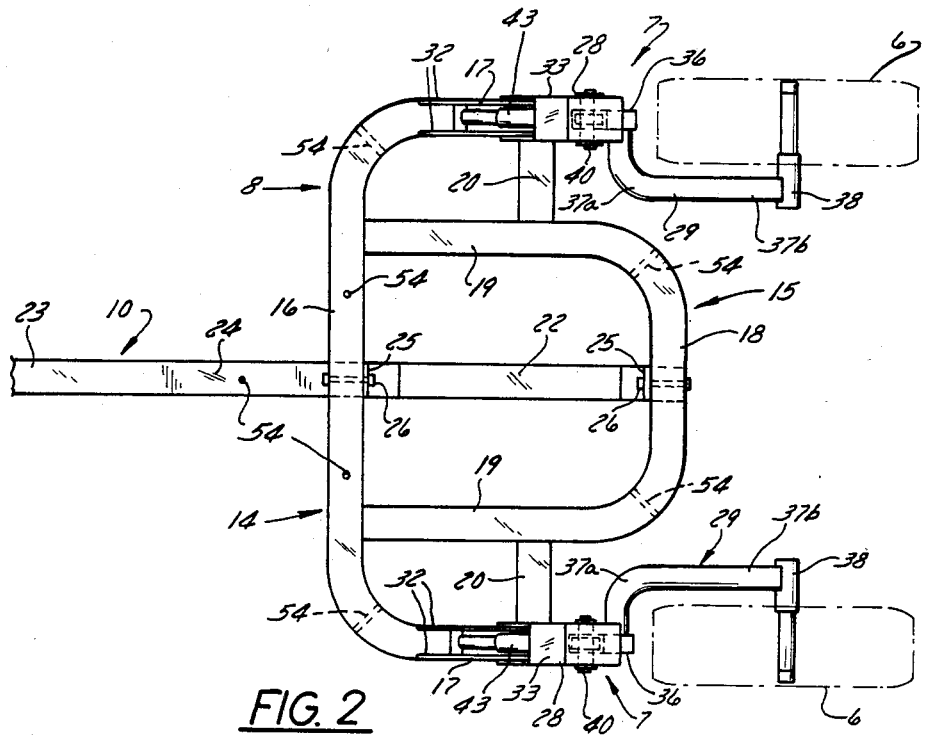
FIG. 2 is a plan view of the trailer frame.
Figure 3:
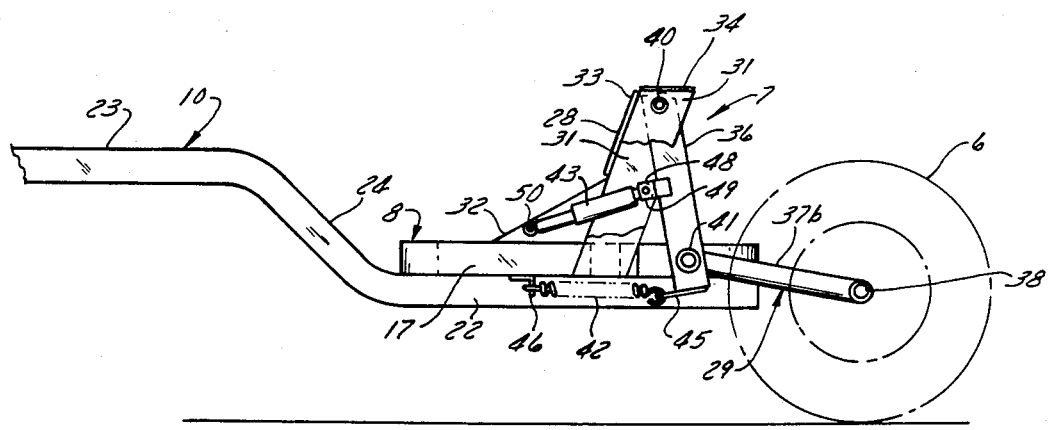
FIG. 3 is a view of the frame in side elevation.

A trailer 5 that embodies the principles of this invention has two wheels 6, one at each side of it. By means of trailing arm suspensions 7 that are described hereinafter, the wheels are connected to a rigid frame 8 on which a body 9 is mounted. Projecting forward from the frame 8 is an elongated tongue or tow-bar 10 whereby the trailer can be connected to a towing vehicle.

The body 9 that is here illustrated is formed as a shell of resinous plastic reinforced with glass fibers. It has a relatively large top opening, extending along most of its length and across most of its width, that is closed and sealed weathertight by a forwardly hinged lid 11. As the description proceeds it will be seen that the frame 8 can accommodate trailer bodies of a wide variety of configurations, the body 9 that is here shown being merely illustrative. In any case, however, it is desirable for the body to be well streamlined, for reasons pointed out above, and it is also desirable that the body comprise a weathertight enclosure; and for these reasons the molded plastic body here illustrated is preferred.

The frame 8 comprises connected front and rear U-shaped members 14 and 15, respectively, each bent out of square section tubing. The front U-shaped member 14 has a transversely extending bight portion 16 and rearwardly projecting legs 17 that extend along opposite sides of the trailer. The rear U-shaped member 15, which is substantially narrower than the front one 14, has its transversely extending bight portion 18 spaced to the rear of the bight portion 16 of the front member and has forwardly projecting legs 19 that are secured at their front ends, as by welding, to the front member bight portion 16. The two U-shaped members are disposed in coplanar relationship, with their several legs 17, 19 parallel to one another. The legs 19 of the rear U-shaped member, being spaced apart by a smaller distance than the legs 17 of the front member, are spaced laterally inwardly from the front member legs. To stiffen the frame, a short coplanar strut 20 bridges from each rear member leg 19 to its outwardly adjacent front member leg 17, near the rear end of the latter. The struts 20 can be made of the same square-section tubing as the U-shaped members 14, 15, and each can be welded to the two legs 17, 19 that it connects.

The tongue or tow-bar 10 can comprise a single piece of the same square-section tubing. It has a straight rear portion 22 that underlies the U-shaped members 14 and 15, a straight front portion 23, and a medial portion 24 that is forwardly adjacent to the front member bight portion 16 and is bent to an S-curvature whereby the front portion 23 is disposed in upwardly offset parallel relation to the rear portion 22. For attaching the tongue to the frame, L-section angle pieces 25 are secured, as by welding, to the top surface of the rear portion 22 of the tongue, in positions such that their upstanding legs can lie flatwise against the inner faces of the frame member bight portions 16, 18. The tongue is held to the U-shaped frame members by bolts 26 that extend fore-and-aft through aligned holes in the upstanding legs of the angle pieces 25 and their respectively adjacent bight portions 16, 18. It will be apparent that the tongue need not be attached until the trailer has reached the user, since he can install it quickly and easily; and thus the trailer can be packaged very compactly for shipping. It will also be observed that the tongue, when installed, materially increases the strength and rigidity of the already sturdy frame.

Each of the two independent wheel suspensions 7 comprises an upright support 28 that is fixed to the rear end portion of a leg 17 of the front U-shaped member, and a wheel arm 29 which is generally L-shaped as viewed from the side of the trailer and which has a pivotal connection with the upright support 28 near the top of it.

Each upright support 28 comprises a pair of identical elongated plates 31 that are flatwise welded to opposite faces of their leg 17 and are thus in opposed flatwise parallel relation to one another. These plates are preferably inclined rearwardly to the vertical, at an angle on the order of 20°, so that their tops are behind the rear end of the leg 17 to which they are secured, and they are accordingly parallelogramshaped. A triangular gusset 32 is preferably connected, as by welding, to the front edge of each plate 31 and the top surface of the leg 17 to which it is secured. The two plates 31 are connected by a transverse bridging plate 33 that is welded to their front edges and extends up to their top edges from the top edges of the gussets 32. The plates 31 are preferably further connected by a cap piece 34 that bridges across their top edges.

Each L-shaped wheel arm 29 has a substantially vertical element 36 comprising a straight length of square-section tubing and a substantially horizontal element 37 that comprises a length of circular-section tubing to which a wheel axle 38 is fastened. Secured in the vertical element 36, near its upper end, is a transverse bushing 39 through which extends a pintle 40 that bridges across the plates 31 near their tops and cooperates with the bushing 39 to pivot the wheel arm 29 for forward and rearward swinging motion.

The circular section tube that comprises the horizontal element 37 of the wheel arm is bent to an L-shape, to have a laterally outwardly projecting limb 37a that is secured at its outer end to the vertical element 36 and a longer rearwardly projecting limb 37b. The shorter limb 37a is received, as at 41, in a closely fitting hole in the vertical element and is securely welded to the vertical element. By reason of this securement and the L-shaped configuration of the horizontal element, its rearwardly projecting limb 37b is in laterally inwardly offset relation to the vertical element. The wheel axle 38, which is securely welded to the rear end of the rearwardly projecting limb 37b, projects laterally outwardly from it. Thus the wheel 6 that is mounted on the axle 38 is directly behind the pivot connection defined by the pintle 40 and the bushing 39, so that rearward forces that the wheel exerts on those connection members are exactly normal to their coinciding axes and thus distributed uniformly along their lengths to ensure a long useful life for them.

Because of the L-shaped configuration of each wheel arm 29, upward movement of its wheel 6 relative to the frame, such as occurs when the wheel rolls over a hump, entails rearward swinging of the vertical element 36 of the wheel arm. That element is yieldingly restrained against swinging towards the rear by shock absorbing means comprising a coiled tension spring 42 and a shock absorber or damper 43. The spring 42 is preferably formed with conventional hooks at its opposite ends and is connected between a lug 45 that is welded to the bottom of the vertical element 36 and a fixed lug 46 that is welded to the underside of the frame leg 17, in forwardly spaced relation to the rear end of that leg. The spring 42 is under a pre-tension imposed by the weight of the trailer and its load. Within the range of zero to normal maximum trailer loads, the spring pre-tension is such that the vertical element 36 of the wheel arm 29 has a downward and rearward inclination to the vertical, and this inclination, together with the opposite rearward inclination of the upright support 28, ensures that there will normally be a substantial distance between the lower portion of the vertical element 36 and the rear end of its adjacent frame leg 17.

The shock absorber or damper 43 is a conventional one of the cylinder type, having a rear pivotal connection to the vertical element 36 and a front pivotal connection to the adjacent frame leg 17. A pintle 48 that comprises the rear pivotal connection bridges across a pair of forwardly projecting lugs 49 that are welded to the opposite sides of the vertical element 36, midway between its top and bottom ends. Another pintle 50 that comprises the front pivotal connection for the shock absorber bridges across the triangular gussets 32, in forwardly spaced relation to the upright support 28. It will be noted that the shock absorber extends between the two plates 31 that comprise the upright support. It will also be observed that the spring 42 and the shock absorber 43 have their axes in the plane of symmetry of the wheel tire, so that shock absorbing movements of the wheel impose no lateral forces upon them.

The body 9 of the trailer is formed with a somewhat elongated wheel well 52 that accommodates the upright support 28 and the wheel 6 behind it. This wheel well does not greatly reduce the interior capacity of the body 9 because the L-shaped configuration of the wheel arm disposes the wheel at only a small distance behind the upright support 28, and because the height of the upright support is such that its top is at about the same level that the top of the wheel attains when the wheel makes a maximum upward excursion relative to the frame. Preferably the sides of the body are formed to provide a skirt portion 53 at each wheel well that outwardly overlies and conceals most of the upright support 28 and the vertical element 36 of the wheel arm, leaving visible little of the suspension beyond the wheel itself.

It will be observed that approximately only the front half of the body 9 overlies the frame comprising the U-shaped members 14, 15. The rear half of the body is thus cantilevered behind the frame, as is possible because of the rigidity and strength of the preferred body material. Suitable holes 54 in the U-shaped members receive bolts (not shown) or the like by which the body is secured to the frame.

For shipment, the wheels 6 are preferably left off of the axles, thus decreasing the overall height of the container. The wheels can of course be mounted on the axles very quickly and secured by conventional means. During shipment, the wheels and the tongue 10 can be stowed inside the body 6, so that the trailer makes a very compact package.

From the foregoing description taken with the accompanying drawings it will be apparent that this invention provides a light two-wheel trailer suitable for motorcycle towing, having a light but sturdy frame and independent wheel suspensions that minimize side-sway and weaving when the trailer travels over bumps, and having its frame and wheel suspensions so arranged as to be cooperable with a streamlined body of large capacity. What is claimed as the invention is:

1. In a trailer having two laterally opposite wheels and having a rigid frame which supports a body and which has a side portion adjacent to each wheel, a shock absorbing independent suspension for each wheel, of the type comprising a rigid wheel arm having a pivotal connection with the frame that defines a laterally extending axis about which the wheel arm swings and carrying a laterally extending axle on which the wheel is rotatable and which is spaced behind said axis so that the wheel can move vertically relative to the frame, said suspension being characterized by:
  A. a rigid support fixed on said side portion of the frame and projecting upwardly therefrom, said support having pivot means near its top that defines said axis;
  B. said wheel arm being substantially L-shaped and having
    (1) an elongated vertical element which has top and bottom ends and which has means near its top end cooperating with said pivot means to provide said pivotal connection, and
    (2) an elongated horizontal element which projects rearward from the bottom of said vertical element and to the rear end of which said axle is fixed;
  C. said horizontal element being in laterally inwardly offset relation to said vertical element, and said axle projecting laterally outwardly from said horizontal element, so that the wheel on the axle is rearwardly aligned with said pivotal connection; and
  D. shock absorbing means connected between said side portion of the frame and said vertical element, in downwardly spaced relation to said pivotal connection and extending forwardly from the vertical element, for yieldingly opposing swinging motion of the wheel arm out of a position in which said vertical element is oriented substantially vertically and said horizontal element is oriented substantially horizontally.

2. In a trailer having two wheels and having a rigid frame which supports a body and which has laterally opposite side portions, a shock absorbing suspension for each wheel connecting it, independently of the other wheel, with one of said side portions of the frame for vertical movement relative to the frame, said suspension comprising:
  A. a rigid support fixed on said side portion of the frame and projecting upwardly therefrom, said support having pivot means fixed near the top thereof that defines a laterally extending axis;
  B. a rigid substantially L-shaped wheel arm having
    (1) an elongated vertical element that has top and bottom ends and has means at its top connecting it with said pivot means for forward and rearward swinging about said axis, and
    (2) an elongated horizontal element that projects rearward from the bottom of said vertical element and is in laterally inwardly offset relation thereto;
  C. an axle on which said wheel is rotatable, fixed to the rear end of said horizontal element to swing downward with forward swinging of the vertical element and projecting laterally outwardly from said horizontal element to dispose the wheel in rearward alignment with said pivot means; and
  D. shock absorbing means connected between said side portion of the frame and said vertical element, in downwardly spaced relation to said axis, to yieldingly resist rearward swinging of said vertical element away from a normal substantially upright orientation thereof.

3. A frame for a trailer having two wheels, on which a body can be mounted, comprising:
  A. a substantially U-shaped front member having a laterally extending bight portion from which a pair of legs project rearward;
  B. a substantially U-shaped rear member having a laterally extending bight portion spaced to the rear of said bight portion of the front member and from which a pair of legs project forward that are spaced laterally inwardly from the legs of the front member and are secured at their front ends to the bight portion of the front member;
  C. an elongated tongue underlying and secured to the bight portions of said front and rear members and projecting forwardly beyond said front member for connection to a towing vehicle;
  D. an upwardly projecting support fixed on the rear end portion of each leg of said front member and having pivot means near its top that defines a laterally extending axis;
  E. a pair of rigid wheel carrying arms, one for each of said supports, each having
    (1) an elongated vertical element which has top and bottom ends and which has means near its top end cooperating with said pivot means to provide a pivotal connection whereby the wheel carrying arm is swingable about said axis,
    (2) an elongated horizontal element which projects rearward from the bottom of said vertical element and is in laterally inwardly offset relation to the vertical element, and
    (3) an axle on which a wheel is rotatable and which projects laterally outwardly from the rear end of said horizontal element to be rearwardly in line with said pivotal connection; and
  F. shock absorbing means for each wheel carrying arm, connected between said vertical element and its adjacent leg of said front member, whereby the wheel carrying arm is yieldingly restrained against swinging around said axis away from a normal position in which its vertical element is oriented substantially vertically.

4. The frame of claim 3, further characterized by: said tongue being detachably secured to the bight portions of the front and rear members.

5. The frame of claim 3, further characterized by: a laterally extending strut rigidly connected between each leg of said rear member and its laterally outwardly adjacent leg of the front member.

6. The frame of claim 3, further characterized by:
  (1) said support comprising a pair of substantially flatwise parallel plate-like members between which said vertical element is swingable; and
  (2) said shock absorbing means comprising
    (a) a coiled tension spring having a rear end connected with the lower end of said vertical element and a front end connected with said leg of the front member, in forwardly spaced relation to the rear end of that leg, and (b) a shock absorber having a front end connected with said vertical element intermediate its top and bottom ends and which extends forwardly between said plate-like members and has a front end connected with said leg of the front member.

7. A frame for a trailer having two wheels, on which a body can be mounted, comprising:
  A. a substantially U-shaped rear member having a laterally extending bight portion and rearwardly projecting legs;
  B. a substantially U-shaped rear member having
    (1) a laterally extending bight portion that is spaced to the rear of said bight portion of the front member, and
    (2) forwardly projecting legs that
      (a) are spaced laterally inwardly from the legs of said front member and
      (b) are secured at their front ends to the bight portion of the front member;
  C. a laterally extending strut rigidly connecting each leg of said front member, near the rear end thereof, with its laterally adjacent leg of said rear member;
  D. An upwardly projecting support fixed on the rear end portion of each leg of said front member and having pivot means at its top that defines a laterally extending axis;
  E. a pair of rigid wheel carrying arms, one for each of said supports, each having
    (1) means at a front end thereof cooperating with said pivot means to provide a pivotal connection whereby the wheel carrying arm is confined to swinging motion about said axis,
    (2) a laterally extending axle at a rear end thereof on which a wheel is rotatable, and
    (3) a portion which is spaced behind and below said pivotal connection, from a rear end of which said axle projects laterally outwardly, and which is in laterally inwardly offset relation to the front end portion of the wheel carrying arm to dispose said axle rearwardly in line with said pivotal connection; and
  F. shock absorbing means for each wheel carrying arm, connected between it and its adjacent leg of said front member, whereby the wheel carrying arm is yieldingly restrained against swinging around said axis away from a normal position in which said axle is behind and below said pivotal connection.

* * * * *